(12) United States Patent
Chen et al.

(10) Patent No.: US 10,699,031 B2
(45) Date of Patent: Jun. 30, 2020

(54) SECURE TRANSACTIONS IN A MEMORY FABRIC

(71) Applicant: HEWLETT PACKARD ENTERPRISE DEVELOPMENT LP, Houston, TX (US)

(72) Inventors: Liqun Chen, Bristol (GB); Chris I. Dalton, Bristol (GB); Fraser John Dickin, Bristol (GB); Nigel Edwards, Bristol (GB); Simon Kai-Ying Shiu, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 237 days.

(21) Appl. No.: 15/328,408

(22) PCT Filed: Oct. 30, 2014

(86) PCT No.: PCT/US2014/063169
§ 371 (c)(1),
(2) Date: Jan. 23, 2017

(87) PCT Pub. No.: WO2016/068941
PCT Pub. Date: May 6, 2016

(65) Prior Publication Data
US 2017/0213054 A1 Jul. 27, 2017

(51) Int. Cl.
*G06F 21/60* (2013.01)
*G06F 21/79* (2013.01)
(Continued)

(52) U.S. Cl.
CPC ............ *G06F 21/79* (2013.01); *G06F 21/606* (2013.01); *G06F 21/64* (2013.01); *H04L 9/083* (2013.01);
(Continued)

(58) Field of Classification Search
CPC .... H04L 9/3236; H04L 9/3242; H04L 9/0643
See application file for complete search history.

(56) References Cited

U.S. PATENT DOCUMENTS 5,831,980 A 11/1998 Varma et al.
5,956,408 A 9/1999 Arnold
(Continued)

FOREIGN PATENT DOCUMENTS

CN 1679003 A 10/2005
JP 2007074761 A 3/2007
(Continued)

OTHER PUBLICATIONS

International Search Report and Written Opinion; PCT/US2014/063169; dated Jul. 29, 2015; 14 pages.
(Continued)

*Primary Examiner* — Ellen Tran
(74) *Attorney, Agent, or Firm* — Park, Vaughan, Fleming & Dowler LLP

(57) ABSTRACT

In an example, transactions are secured between electronic circuits in a memory fabric. An electronic circuit may receive a transaction integrity key. The electronic circuit may compute a truncated message authentication code (MAC) using the received transaction integrity key and attach the truncated MAC to a security message header (SMH) of the transaction.

20 Claims, 7 Drawing Sheets

(51) Int. Cl.
*G06F 21/64* (2013.01)
*H04L 9/08* (2006.01)
(52) U.S. Cl.
CPC ...... *H04L 9/0822* (2013.01); *H04L 2463/061* (2013.01)

(56) References Cited

U.S. PATENT DOCUMENTS

| | | | |
|---|---|---|---|
| 6,092,191 | A | 7/2000 | Shimbo et al. |
| 7,191,437 | B1 | 3/2007 | Coatney et al. |
| 7,320,008 | B1 | 1/2008 | Colgrove |
| 7,506,368 | B1 | 3/2009 | Kersey et al. |
| 7,725,603 | B1 | 5/2010 | Kanevsky et al. |
| 7,778,253 | B2 | 8/2010 | Balakrishnan et al. |
| 7,876,897 | B2 | 1/2011 | Yi |
| 8,001,054 | B1 | 8/2011 | Peart et al. |
| 8,130,953 | B2 | 3/2012 | Gustavsson |
| 8,218,759 | B2 | 7/2012 | Moffat et al. |
| 8,245,032 | B2 | 8/2012 | Donley et al. |
| 8,442,526 | B1 | 5/2013 | Bertz et al. |
| 8,503,679 | B2 | 8/2013 | Bugbee |
| 8,560,849 | B2 | 10/2013 | Machani et al. |
| 8,646,090 | B1 | 2/2014 | Gadde et al. |
| 8,726,037 | B2 | 5/2014 | Pean et al. |
| 8,726,042 | B2 | 5/2014 | Lange et al. |
| 9,087,189 | B1 | 7/2015 | Koeten et al. |
| 9,992,197 | B2 | 6/2018 | Agiwal et al. |
| 2002/0056050 | A1 | 5/2002 | Heiden |
| 2003/0161064 | A1* | 8/2003 | Hori ............. G11B 19/122 360/55 |
| 2004/0049774 | A1 | 3/2004 | Boyd et al. |
| 2005/0187873 | A1* | 8/2005 | Labrou .............. G06Q 20/02 705/40 |
| 2006/0045099 | A1 | 3/2006 | Chang et al. |
| 2006/0085607 | A1 | 4/2006 | Haruma |
| 2006/0264202 | A1 | 11/2006 | Hagmeier et al. |
| 2007/0067437 | A1 | 3/2007 | Sindambiwe |
| 2007/0130470 | A1 | 6/2007 | Blom et al. |
| 2007/0186279 | A1 | 8/2007 | Zimmer et al. |
| 2007/0260891 | A1* | 11/2007 | Starr .............. G06F 21/6218 713/193 |
| 2008/0060055 | A1 | 3/2008 | Lau |
| 2008/0095368 | A1 | 4/2008 | Iida et al. |
| 2008/0112405 | A1 | 5/2008 | Cholas et al. |
| 2009/0073992 | A1 | 3/2009 | Makishima et al. |
| 2009/0080432 | A1 | 3/2009 | Kolakeri et al. |
| 2009/0161692 | A1 | 6/2009 | Hirata et al. |
| 2009/0254647 | A1 | 10/2009 | Elzur et al. |
| 2010/0042689 | A1 | 2/2010 | Doggett |
| 2010/0071030 | A1 | 3/2010 | Rosenan et al. |
| 2010/0232793 | A1 | 9/2010 | Atkinson |
| 2012/0131289 | A1 | 5/2012 | Taguchi et al. |
| 2012/0150742 | A1* | 6/2012 | Poon .............. G06Q 20/20 705/44 |
| 2012/0150748 | A1* | 6/2012 | Law ............... G06Q 20/20 705/71 |
| 2012/0185699 | A1 | 7/2012 | Arnold |
| 2012/0204032 | A1 | 8/2012 | Wilkins et al. |
| 2012/0265840 | A1 | 10/2012 | Benner et al. |
| 2012/0284524 | A1 | 11/2012 | Ho et al. |
| 2013/0042052 | A1 | 2/2013 | Colgrove et al. |
| 2013/0080790 | A1 | 3/2013 | Pean et al. |
| 2013/0117577 | A1 | 5/2013 | Hars et al. |
| 2013/0191649 | A1 | 7/2013 | Muff et al. |
| 2013/0227201 | A1 | 8/2013 | Talagala et al. |
| 2013/0246840 | A1 | 9/2013 | Kumano et al. |
| 2013/0312082 | A1 | 11/2013 | Izu et al. |
| 2014/0021471 | A1 | 1/2014 | Pietambaram et al. |
| 2014/0075189 | A1 | 3/2014 | Abraham et al. |
| 2014/0095805 | A1 | 4/2014 | Kapil et al. |
| 2014/0095865 | A1 | 4/2014 | Yerra et al. |
| 2014/0115219 | A1 | 4/2014 | Ajanovic et al. |
| 2014/0201471 | A1 | 7/2014 | Cutter et al. |
| 2014/0223192 | A1* | 8/2014 | Dent ............. G06F 21/71 713/189 |
| 2014/0325013 | A1 | 10/2014 | Tamir et al. |
| 2014/0325115 | A1 | 10/2014 | Ramsundar et al. |
| 2014/0331297 | A1 | 11/2014 | Innes et al. |
| 2015/0089010 | A1 | 3/2015 | Tsirkin et al. |
| 2015/0146614 | A1 | 5/2015 | Yu et al. |
| 2015/0220429 | A1 | 8/2015 | Cypher et al. |
| 2015/0341365 | A1 | 11/2015 | Basso et al. |
| 2015/0371327 | A1 | 12/2015 | Kohari et al. |
| 2016/0036819 | A1 | 2/2016 | Zehavi et al. |
| 2016/0342510 | A1 | 11/2016 | Pani |
| 2017/0300259 | A1 | 10/2017 | Cilfone et al. |
| 2019/0087269 | A1 | 3/2019 | Gladwin et al. |

FOREIGN PATENT DOCUMENTS

| | | |
|---|---|---|
| TW | 200901724 A | 1/2009 |
| WO | 2010/096921 A1 | 9/2010 |

OTHER PUBLICATIONS

Shekhawat N. et al, To Enhance the Security in Terms of Malicious Node Attacks by Using Alarm Protocol in WSN, (Research Paper), Proceedings for IIJCS, Apr. 2014, vol. 2, No. 4, 6 Pages.

H. Krawczyk; "HMAC: Keyed-Hashing for Message Authentication"; Networking Group Request for Comments: 2104, Category: Informational; Feb. 1997; (11 pages).

International Search Report and Written Opinion; PCT/US2014/061934; dated Jul. 13, 2015; 14 pages.

Novakovic, S. et al., Scale-out NUMA, (Research Paper), Mar. 1-4, 2014, 15 Pages.

R. Rivest; "The MD5 Message-Digest Algorithm"; Network Working Group Request for Comments: 1321; MIT Laboratory for Computer Science and RSA Data Security, Inc.; Apr. 1992; (20 pages).

S. Turner; "Updated Security Considerations for the MD5 Message-Digest and the HMAC-MD5 Algorithms"; Internet Engineering Task Force (IETF) Request for Comments: 6151, Updates: 1321, 2104, Category: Informational, ISSN: 2070-1721; Mar. 2011; (7 pages).

International Search Report & Written Opinion received in PCT Application No. PCT/US2014/063174, dated Jun. 29, 2015, 3 pages.

Microsoft, "Choosing the IPSec Protocol," available online at <https://docs.microsoft.com/en-us/previous-versions/windows/it-pro/windows-server-2003/cc757847(v=ws.10)?redirectedfrom=MSDN>, Oct. 8, 2009, 3 page.

Zhuang et al., "HIDE: An Infrastructure for Efficiently Protecting Information Leakage on the Address Bus", ASPLOS'04, Oct. 7-13, 2004, 13 pages.

\* cited by examiner

SECURE TRANSACTIONS IN A MEMORY FABRIC

BACKGROUND

Communication protocols exist to provide standard formats for exchanging messages between computers, devices, circuits, etc. In the memory domain, a memory protocol is often used to communication information between memory and a memory controller or other electronic circuits. For example, Double Data Rate (DDR) is a protocol for synchronous dynamic random-access memory (SDRAM). The DDR protocol allows data to be transferred from memory to another electronic circuit on both the rise and fall of a clock cycle. According to the DDR protocol, the data may be transferred from memory using parallel lanes of a data bus.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
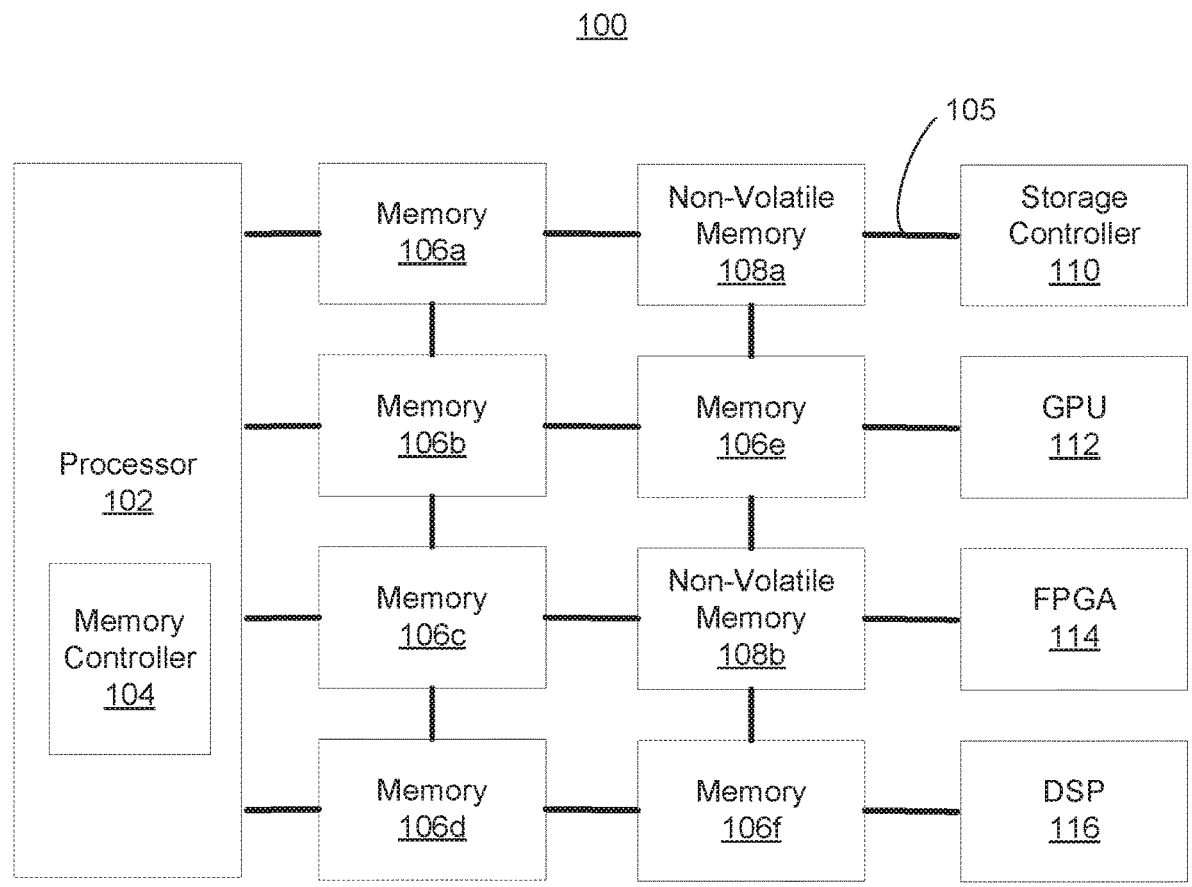
FIG. 1 shows a block diagram of a memory fabric, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Disclosed herein are examples to secure transactions between integrated or discrete electronic circuits of a memory fabric. In one example, the memory fabric is a physical layer topology with electronic circuits that pass data to each other through interconnecting communication channels (e.g., links). Routing on the interconnecting communication channels is performed according to a memory fabric protocol. The memory fabric may be inside of a device such as a mobile device and used to communicate information between electronic circuits inside of the device. A transaction, for instance, includes a data packet with multiple protocol fields that specify an operation and may include an optional payload for exchange between a source electronic circuit and a destination electronic circuit. The electronic circuits of the memory fabric may include processors, memory, memory controllers, input/output (I/O) controllers, storage controllers, field-programmable gate arrays (FPGAs), digital signal processors (DSPs), graphics processing units (GPUs), or any circuit in a computer system. According to the disclosed examples, the transactions may be secured using cryptographic methods for data integrity, data confidentiality, and key management. The memory fabric, as described above, may be internal to a chip or may extend chip-to-chip interconnections. A memory fabric protocol is a communication protocol specifying rules or standards for communicating in the memory fabric.

The data integrity of a transaction between electronic circuits of a memory fabric may be maintained to assure the accuracy and consistency of the transaction. That is, the transaction is protected against modification in an unauthorized or undetected manner by a third party. For example, a source electronic circuit may receive a transaction integrity key (TIK). The source electronic circuit may compute a truncated message authentication code (MAC) using the received TIK and attach the truncated MAC to a security message header (SMH) of the transaction to protect the integrity of the transaction. The SMH of the transaction may also include a concatenation of at least one of a sequence number, a time value, and an arbitrary nonce to protect against a replay attack. According to an example, the truncated MAC may be a 64-bit keyed-hash message authentication code (HMAC).

The source electronic circuit may receive the TIK, a transaction integrity key (TEK), and/or a transaction key (TK) from a key distribution server in the memory fabric. The TK, for instance, may be TIK, TEK, or a combination thereof. The TIK, TEK, and TK may be generated by the key distribution server. Alternatively, in response to receiving the TK from the key distribution server, the source electronic circuit may derive a TIK and a TEK from the TK using a key derivation function. On the other hand, the source electronic circuit may receive a TIK and a TEK that was derived from a master key at the key distribution server using a key derivation function.

According to an example, both the source electronic circuit and the destination electronic circuit may receive the TIK from a key distribution server. Prior to receiving the TIK, the TIK may be encrypted by the key distribution server using an authentic copy of a public encryption key of the source electronic circuit and the destination electronic circuit. Additionally, the TIK may be signed by the key distribution server using a private digital signature key of the key distribution server. As a result, for instance, the integrity of the received TIK may be verified by the source electronic circuit and the destination electronic circuit using an authentic copy of a public digital verification key of the key distribution server. The source electronic circuit and the destination electronic circuit may then decrypt the received TIK using their respective stored private decryption keys.

According to another example, the payload of the transaction may be encrypted using the TEK to protect the confidentiality of the payload. In this example, the 64-bit MAC or HMAC may be computed using the TIK and the encrypted payload. The source electronic circuit may then transmit the transaction to a destination electronic circuit that shares a copy of the TIK with the source electronic circuit. As a result, the destination electronic circuit may verify the data integrity of the transmission using the shared TIK.

The examples disclosed herein may be implemented according to a scalable and extensible memory fabric protocol that interconnects numerous electronic circuits at high data transfer rates. The disclosed memory fabric protocol operates on physical layer communications and does not operate on layer 3 of the Open Systems Interconnection (OSI) protocol stack (e.g., Transmission Control Protocol (TCP)/Internet Protocol (IP); TCP/IP). For example, the disclosed memory fabric protocol may include an abstract physical layer interface to support multiple physical layers, thus allowing the disclosed memory fabric protocol to be tailored to market needs independent of devices (e.g., network interface controller (NIC)) or operating systems.

The disclosed memory fabric protocol may be a serial protocol to provide high-bandwidth in the communication channels of the memory fabric and enhance the scalability of the electronic circuits of the memory fabric. In other words, the serial memory fabric protocol may provide scalability of bandwidth, as it is easier to add more communication channels to scale the bandwidth.

The improved scalability and extensibility of the disclosed memory fabric protocol, however, may expose an electronic circuit to malicious or compromised electronic circuits in the distributed memory fabric. Accordingly, examples of the present disclosure use cryptography to safeguard the integrity and confidentiality of transactions between electronic circuits. In particular, the disclosed examples provide cryptographic security for a high-performance, scalable and extensible memory fabric protocol with small minimum-size packets.

That is, the disclosed examples provide authentication and access control in a memory fabric protocol where minimal overhead space (e.g., 8 bytes) is allotted for security of transmissions.

In contrast to the disclosed memory fabric protocol, software layer security protocols, such as TCP/IP security, operate over slower network technologies and tolerate more latency, more cost, more overhead and more complexity. For example, the minimum overhead for a Transport Layer Security/Secure Sockets Layer (TLS/SSL) packet is 90 bytes per packet, which is about a 6% overhead, given 1500 byte packets. For example, the minimum size of a packet for the disclosed memory fabric protocol may be as low as 24 bytes. Accordingly, minimal bytes may be allocated in the packet for security. As a result, the disclosed memory fabric protocol provides lower-overhead and lower-cost to maximize the scalability and extensibility of electronic circuits.

With reference to FIG. 1, there is shown a block diagram of a memory fabric 100, according to an example of the present disclosure. It should be understood that the memory fabric 100 may include additional components and that one or more of the components described herein may be removed and/or modified without departing from a scope of the memory fabric 100.

The memory fabric 100 is depicted by way of example as including electronic circuits such as a processor 102, a memory controller 104, volatile memory 106a-f, non-volatile memory 108a-b, a storage controller 110, a graphical processor unit (GPU) 112, a field-programmable gate array (FPGA) 114, and a digital signal processor (DSP) 116. Each electronic circuit may include one or more physical interfaces to communicate with another physical interface via a link 105 (i.e., communication channel) between two electronic circuits.

According to an example, a link 105 may include at least one transmitter lane and one receiver lane and may be either symmetric or asymmetric. A link includes a physical medium for transmitting signals. A symmetric link is a link where the number of transmitter lanes is equal to the number of receiver lanes. Conversely, an asymmetric link is a link where the number of transmitter lanes is not equal to the number of receiver lanes. Depending upon the underlying physical layer capabilities, the number of transmitter and receiver lanes may be statically provisioned or dynamically adjusted on a per-link basis. Additional capacity and performance scaling can be achieved through the use of integrated or discrete switches. As a result, a variety of topologies may be constructed from simple daisy chains to star to 3D-Torus to increase aggregate performance and optionally improve resiliency of the memory fabric.

The processor 102, which may be a microprocessor, a micro-controller, an application specific integrated circuit (ASIC), or the like, is to perform various processing functions in the memory fabric 100. For example, the processor may perform the function of securing transactions between the electronic circuits of a memory fabric 100. The memory controller 104 is an electronic circuit that manages the flow of data (e.g., high-level transactions such as reads, writes, etc.) going to and from the memory 106a-f. The memory controller 104 may be a separate electronic circuit or may be integrated into the die of the processor 102. The memory 106a-f may include static RAM (SRAM), dynamic RAM (DRAM), or the like. Moreover, each of the memory 106a-f may include a separate media controller to service the high-level transactions and perform media-specific services and management.

The processor 102, memory controller 104, and memory 106a-f may be coupled by links to the non-volatile memory 108a-b, the storage controller 110, the GPU 112, the FPGA 114, and the DSP 116. The non-volatile memory 108a-b may include read-only memory (ROM), flash memory, magnetic computer storage devices, and the like. The storage controller 110, for instance, may communicate with a hard disk or disk drive. The GPU 112 may manipulate and alter memory 106a-f to accelerate the creation of images in a frame buffer intended for output to a display. The FPGA 114, for example, is an electronic circuit that may be programmed after manufacturing. Lastly, the DSP 116 may be used to measure, filter and/or compress continuous real-world analog signals. These electronic circuits (e.g., the non-volatile memory 108a-b, the GPU 112, the FPGA 114, and the DSP 116) may access the memory 106a-f through the memory controller 104 of the memory fabric 100.

As noted above, the protocol for the memory fabric 100 may be optimized to support memory semantic communications using a scalable packetized transport with scalable and power-proportional link, physical layers, and underlying memory media access. That is, each market segment may require one or more market-specific physical layers to be supported. According to an example, the memory fabric protocol includes an abstract physical layer interface to support multiple physical layers and media. As a result, the physical layers may evolve or be replaced without disrupting or waiting for the entire ecosystem to move in lock-step. The abstract physical layer may include the media access control sublayer, physical coding sublayer, and physical medium attachment sublayer. The electronic circuits of the memory fabric 100 may implement the abstract physical layer to facilitate interoperable communications.

Figure 2:
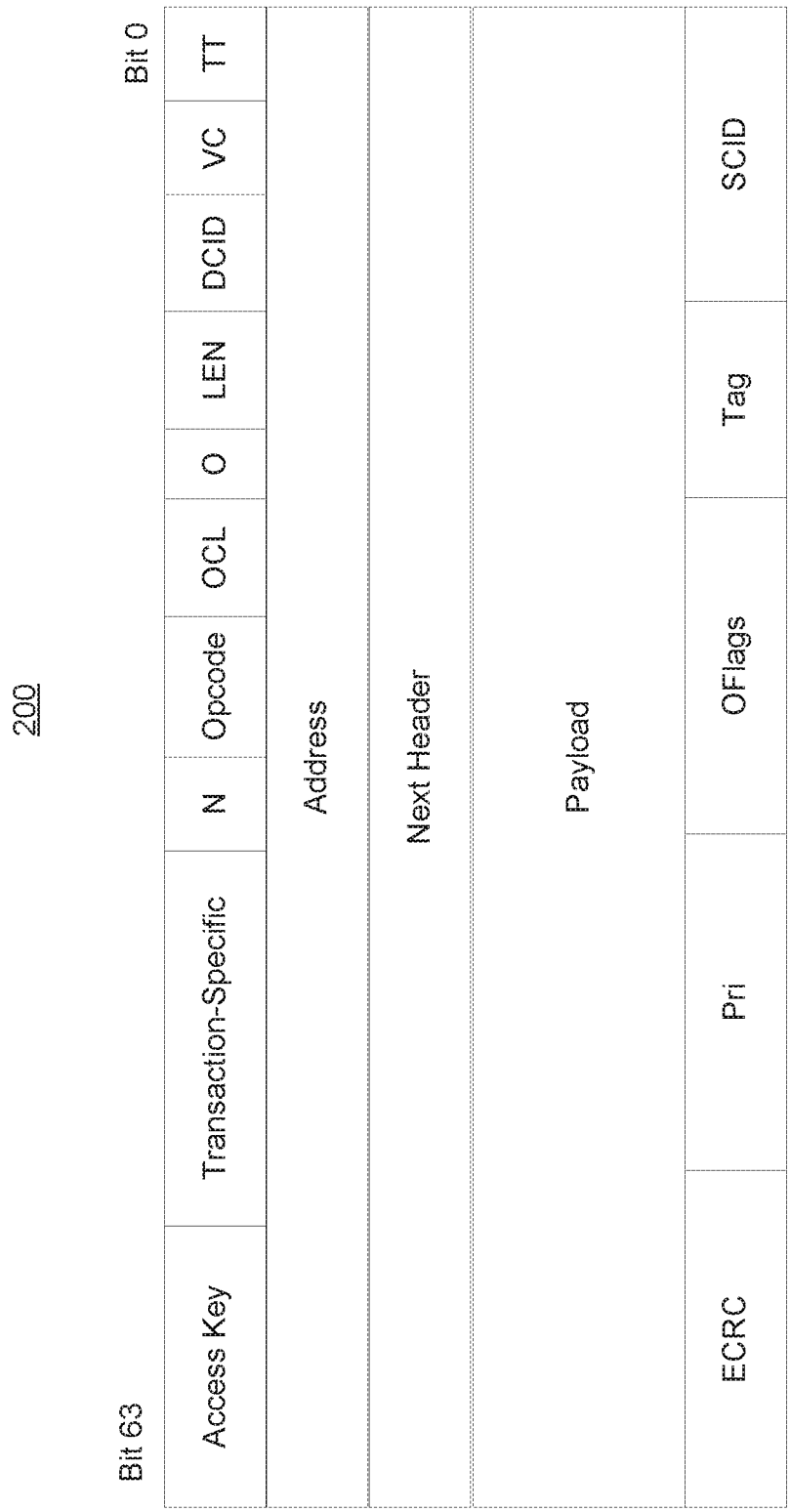
FIG. 2 shows a packet of a memory fabric protocol, according to an example of the present disclosure.

With reference to FIG. 2, there is shown an example of a packet 200 of the memory fabric protocol of the present disclosure. The packet 200, for instance, may include a Next Header field that carries security information (e.g., SMH) to enable electronic circuits of the memory fabric to authenticate that a transaction was transmitted by an authorized source and was not tampered with during transit.

It should be understood that the packet 200 may include additional protocol fields and that one or more of the protocol fields described herein may be removed and/or modified without departing from a scope of the packet 200. The packet 200 is depicted as including the protocol fields shown in TABLE 1 below.

TABLE 1

| Field Name | Size (Bits) | Description |
| --- | --- | --- |
| Access Keys | Variable (e.g., 16) | Indicates restricted or unrestricted access to targeted resources. |
| Transaction-Specific | Variable | May have different meanings for different transactions. |
| Next Header Present (N) | 1 | Indicates if a 64-bit next header field follows the initial 64-bits of protocol header. |
| Operation Code (OpCode) | 5 | Indicates an operation type as well as an operation payload size (if present). |
| OpClass (OCL) | Variable (e.g., 4) | Indicates an operation class. |
| OpClass Present (O) | 1 | Indicates whether the OCL field is present. The presence of the OCL may indicate the presence of the access key field presence. |
| Length (Len) | 6 | Indicates the encoded transaction length in 64-bit multiples. |
| Destination Component Identifier (DCID) | 11 | Identifies a destination electronic circuit. |
| Virtual Channel (VC) | 3 | Identifies a virtual channel for the transaction. |
| Transaction Type (TT) | 2 | Indicates the type of the transaction (e.g., link-local, unicast end-to-end transaction, multicast end-to-end, etc.). |
| Address | 64 | Indicates a unique identifier to access or target an electronic circuit's resources (e.g., memory). |
| Payload | Variable | Transaction-specific payload. |
| End-to-End Cyclic Redundancy Check (ECRC) | 24 | Data Integrity Field |
| Priority (Pri) | 3 | Differentiates transaction processing within the receiving electronic circuit by, for instance, determining the transaction execution order. |
| Operation Flags (OFlags) | 6 | Various operation flags. |
| Tag | 20 | Associates a request with a response or acknowledgement. |
| Source Component Identifier (SCID) | 11 | Identifies a source electronic circuit. |

According to an example, the Next Header field may be included in the packet 200 to allow multiple semantics to be attached based on solution needs. For instance, the Next Header may be a security message header (SMH) that includes a 64-bit HMAC. In this example, the Next Header enables electronic circuits to authenticate that the transaction was transmitted by an authorized source and was not tampered with during transit. The presence of the Next Header does not impact transaction relay and if an electronic circuit does not support the configured meaning, the Next Header may be ignored upon receipt. That is, the electronic circuit may locate the subsequent payload or protocol fields even if it does not support the Next Header.

Figure 3:
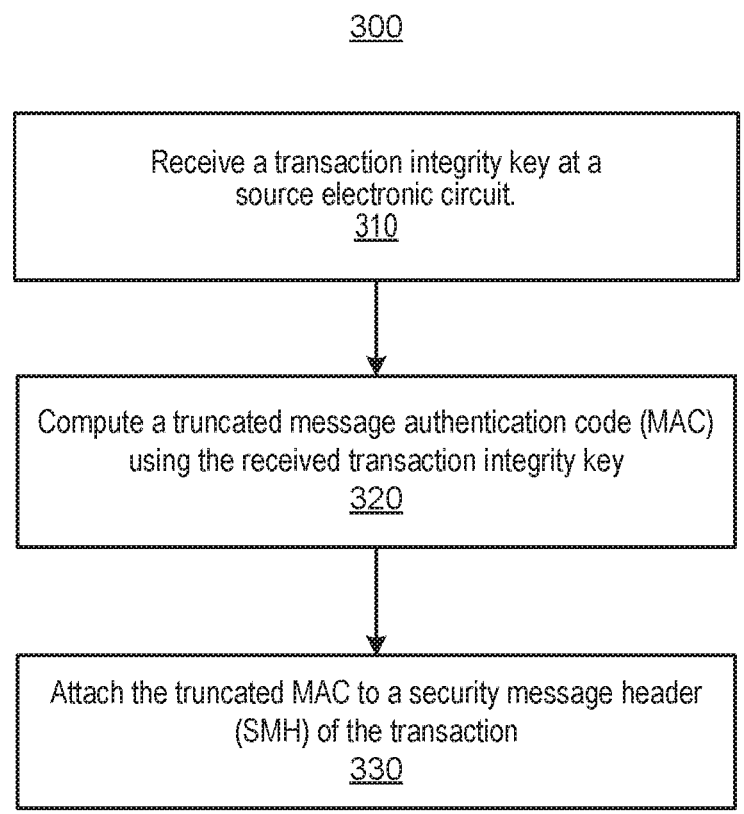
FIG. 3 shows a flow chart of a method to secure transactions between electronic circuits communicating via a memory fabric according to a memory fabric protocol of an example of the present disclosure.

With reference to FIG. 3, there is shown a flow chart of a method 300 to secure transactions between electronic circuits according to a memory fabric protocol of an example of the present disclosure. The method 300 may be implemented, for example, by one of the electronic circuits depicted in FIG. 1.

At block 310, a source electronic circuit of the memory fabric 100 may receive a TIK, TEK, and/or a TK. The TK may be a 128-bit TIK, TEK, or a combination thereof. According to an example, the TIK, TEK, and/or TK may be received from another electronic circuit in the memory fabric 100. The another electronic circuit may for example be a key distribution server. The method for receiving the TK, TIK, and/or TEK from the key distribution server is discussed in more detail with respect to FIGS. 4 and 5 below.

At block 320, the source electronic circuit may compute a truncated message authentication code (MAC) using the received TIK. Specifically, for instance, the truncated MAC may be computed from a MAC algorithm such as 64-bit HMAC (Hash-based Message Authentication Code) with an input of the 128-bit symmetric TIK concatenated with a payload (e.g., HMAC(TIK, PAYLOAD)). The truncated MAC may provide data integrity for the transaction. That is, only an authorized electronic circuit may generate or verify a valid transaction over the memory fabric 100 and any unauthorized modification to the transaction may be detected by the source electronic circuit. The truncated MAC may provide fundamental mechanisms for electronic circuit authentication and access control.

When a transaction is sensitive to eavesdropping, the electronic circuits of the memory fabric 100 may expect both data integrity of the transaction and data confidentiality of the payload. According to an example, the payload of the transaction may be encrypted using the TEK at the source electronic circuit. The truncated MAC may then be computed using the TEK and the encrypted payload. In this example, an encryption algorithm such as Ciphertext Stealing-Advanced Encryption Standard (XTS-AES) may be used along with the truncated MAC (e.g., HMAC). These two algorithms may be combined in an Encrypt-then-MAC algorithm that achieves authenticated encryption of the payload. Accordingly, when both data integrity and data confidentiality is desired, both the TIK and TEK should be stored in the source electronic circuit.

At block 330, the source electronic circuit may attach the truncated MAC to a security message header (SMH) of the transaction. That is, for example, given a payload and the TIK, the 64-bit SMH is computed by SMH=HMAC(TIK, PAYLOAD). Thus, the method 300 adds a SMH to the Next Header field of each transaction in order to secure the transactions in the disclosed memory fabric protocol. The transaction may then be transmitted to a destination electronic circuit that shares copy of the transaction integrity key with the source electronic circuit.

Therefore, the method 300 has low communication and computational overheads, supports robust data integrity, and addresses significant identified threats. More specifically, the method 300 demonstrates that strong authentication using 128-bit keys may be communicated using a 64-bit quantity which can be added to transactions with modest protocol efficiency and performance impact according to the disclosed examples.

Figure 4:
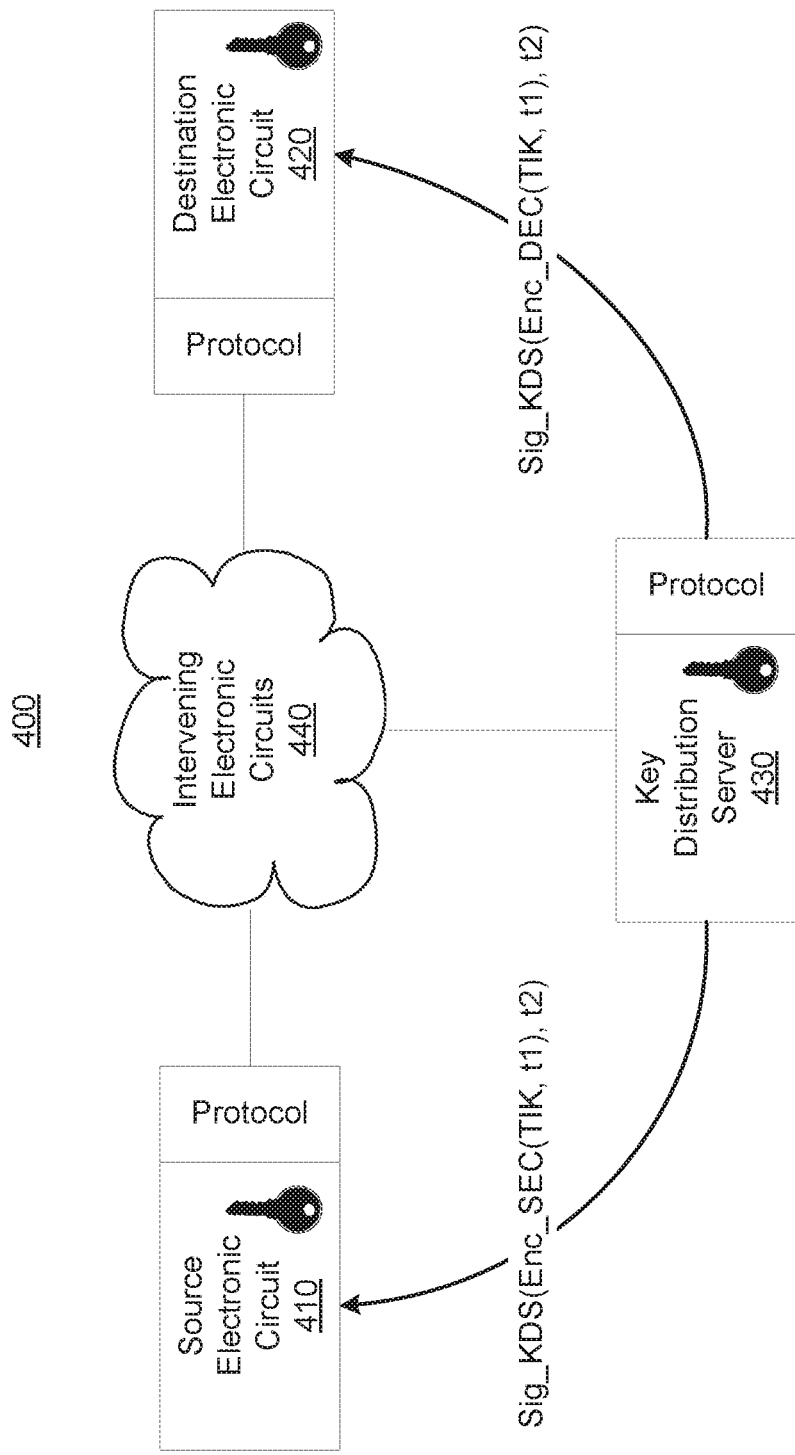
FIG. 4 shows a flow chart of a key management system, according to an example of the present disclosure.

FIG. 4 shows a block diagram of a key management system 400, according to an example of the present disclosure. The key management system 400 according to the memory fabric protocol may include a source electronic circuit 410, a destination electronic circuit 420, a key distribution server 430, and intervening electronic circuits 440.

According to an example, cryptographic keys are managed by a centralized third-party key distribution server 430. Each electrical circuit in the memory fabric 100 (source electronic circuit 410, destination electronic circuit 420, and key distribution server 430) may have a unique identifier and a public/private key pair. The public/private key pair, for example, may be generated during manufacture of the respective electronic circuits. A key may be cryptographically bound with the unique identifier. For example, the public key may directly serve as the identifier for the respective electronic circuit.

An electrical circuit in the memory fabric 100 may be assigned to be the key distribution server 430. Each transaction according to the memory fabric protocol may include the source electronic circuit 410, intervening electronic circuits 440, and a destination electronic circuit 420 (or multiple destination electronic circuits). Accordingly, during the operation of the memory fabric protocol, if the source electronic circuit 410 and the destination electronic circuit 420 have not yet established a shared TIK, the key distribution server by 430 may distribute the TIK to the source electronic circuit 410 and the destination electronic circuit 420 using the key management method described below in FIG. 5.

According to an example, an asymmetric key belonging to the source electronic circuit 410 or the destination electronic circuit 420 may be an encryption/decryption key pair, and the asymmetric key belonging to a key distribution server 430 may be a digital signature/signature verification key pair. The key distribution server 430 may have an authentic copy of both the source electronic circuit's public key and destination electronic circuit's public key. Additionally, both the source electronic circuit 410 and the destination electronic circuit 430 may have an authentic copy of the key distribution server's public key. According to an example, a key certification service may provide authentic copies of the public keys to the respective electronic circuits as discussed above. Alternatively, during a first computer boot sequence, each electronic circuit may register their identifier and public key with the key distribution server 430 assuming that the communication channel between the key distribution server 430 and the source electronic circuit 410 or destination electronic circuit 420 is safe.

Figure 5:
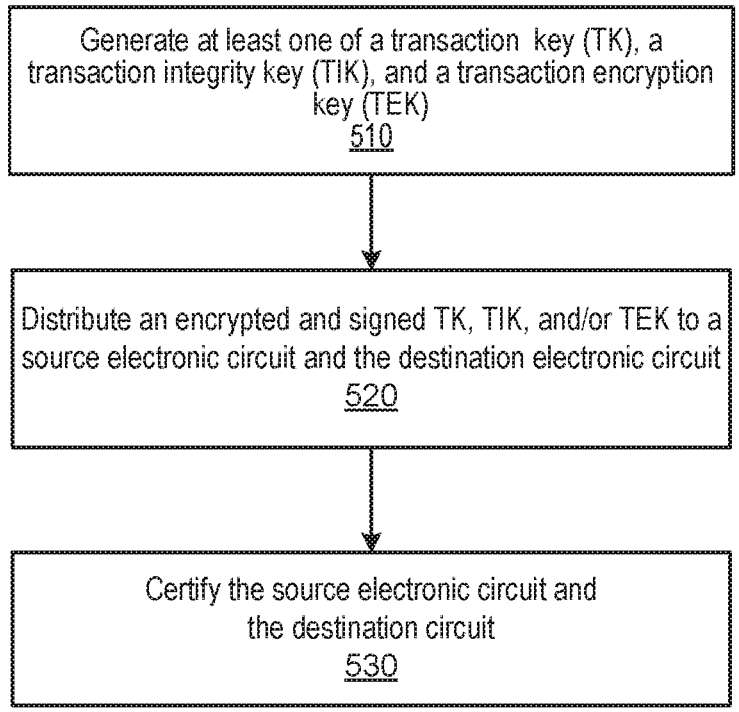
FIG. 5 shows a flow chart of a method to distribute keys to electronic circuits according to a memory fabric protocol of an example of the present disclosure.

With reference to FIG. 5, there is shown a flow chart of a method 500 to distribute keys to electronic circuits according to a memory fabric protocol of example of the present disclosure. The method 500 may be implemented, for example, by one of the electronic circuits depicted in FIG. 1. The method 500 allows the key distribution server 430 to generate and distribute a TK, TIK, and/or TEK to the source electronic circuit 410 and to one or more destination electronic circuits.

At block 510, the key distribution server 430 may generate a TK, TIK and/or TEK from scratch. Alternatively, the key distribution server 430 may derive a TIK and a TEK from a TK using a master key with a key derivation function (KDF).

At block 520, the key distribution server 430 may distribute the TK, TIK, and/or the TEK to the source electronic circuit 410 and destination electronic circuit 420 using a combined encryption and signature algorithm. For example, the key distribution server (KDS) 430 may encrypt a plaintext under the receiver's public key (e.g., source electronic circuit (SEC) 410 or the destination electronic circuit (DEC) 420) and sign the ciphertext under the key distribution server's private key.

Accordingly, the key distribution server 430 may then transmit the encrypted and signed TIK to the source electronic circuit 410 (e.g., sig_KDS(enc_SEC(TK, t1), t2)) and to the destination electronic circuit 420 (e.g., sig_KDS (enc_DEC(TK, t1), t2), where t1 and t2 denote optional tests such as a time value, sequence value or nonce, which may be used against replay attacks as discussed further below).

Thus, the source electronic circuit 410 or the destination electronic circuit 420 may receive the encrypted and signed TK, TIK, and/or TEK from the key distribution server 430. If the source electronic circuit 410 or the destination electronic circuit 420 receives a TK, the source electronic circuit 410 or the destination electronic circuit 420 may derive a TIK and TEK from the TK using a key derivation function (e.g., TIK=KDF(TK, "Integrity") and TEK=KDF(TK, "Encryption"), where "Integrity" and "Encryption" represent distinct salt values). In order to maintain the security level for encryption and MAC using the derived keys, the TK should have sufficient entropy. For example, the length of TK may be longer than the length of max (TIK, TEK). The source electronic circuit 410 or the destination electronic circuit 420 may then verify the integrity of the received TK, TIK, and/or TEK using an authentic copy of a public digital verification key of the key distribution server 430, and decrypt the received TK, TIK, and/or TEK using a private decryption key of the respective electronic circuit.

At block 530, the key distribution server 430 may certify the source electronic circuit 410 and destination electronic circuit 420. According to an example, the key distribution server 430 may introduce the source electronic circuit 410 and destination electronic circuit 420 by including their identifiers along with the distributed TIK. For instance, the key distribution server may transmit the TK to the source electronic circuit 410 as sig_KDS(enc_SEC(DEC, TK, t1), t2) and to the destination electronic circuit 420 as sig_KDS (enc_DEC(SEC, TK, t1), t2).

While FIGS. 4 and 5 show key management and subsequent communication between a pair of electronic circuits, the method 500 may be used for a larger number of communicating peers. In the case in which the source electronic circuit 410 communicates with multiple destination electronic circuits, the source electronic circuit 410 and the multiple destination electronic circuits may belong to a group that all share the same TIK. Alternatively, the source electronic circuit 410 and the multiple destination electronic circuits may be partitioned into several subgroups, each of the subgroups sharing a single TIK.

As discussed above in FIG. 2, the packet 200 of the disclosed memory fabric protocol may not include a built-in sequence number field. Accordingly, the use of either MAC or encrypt-then-MAC in method 300 may be susceptible to a replay attack. A replay attack is when an adversary resends a previously recorded and successful transaction along with the corresponding MAC field to purposefully deceive a receiver.

According to an example, if the transactions for an application are transmitted in sequence, a challenge-response protocol with a rolling arbitrary nonce may be implemented. That is, the SMH of the $i^{th}$ transaction may be used as the sequence number of the $i+1^{th}$ transaction. According to another example, sequence numbers may be designated for a key. For example, when a TIK is established, its default initial sequence number is 0, and then for every new transaction, the sequence number may be incremented by 1. According to another example, a time value may be used for uniqueness of a transaction. For instance, time values require synchronization of timing between the source electronic circuit 410 and the destination electronic circuit 420. Thus, if accurate these time values are accurate (e.g., within fractions of a nanosecond), then synchronization of timing between the electronic circuits is achievable and the time value may be used for uniqueness.

According to yet another example, a combination of a sequence number and a clock may be implemented to prevent a replay attach. For example, the 64-bit SMH may be divided into a 32-bit HMAC and 32-bit sequence number. As a result, for instance, a hash may be performed on a payload, a sequence number, and current value of the clock, which is not included in the payload.

Some or all of the operations set forth in the methods 300 and 500 may be contained as utilities, programs, or subprograms, in any desired computer accessible medium. In addition, the methods 300 and 500 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include conventional computer system RAM, ROM, EPROM, EEPROM, and magnetic or optical disks or tapes. It is therefore to be understood that any electronic device capable of executing the above-described functions may perform those functions enumerated above.

Figure 6:
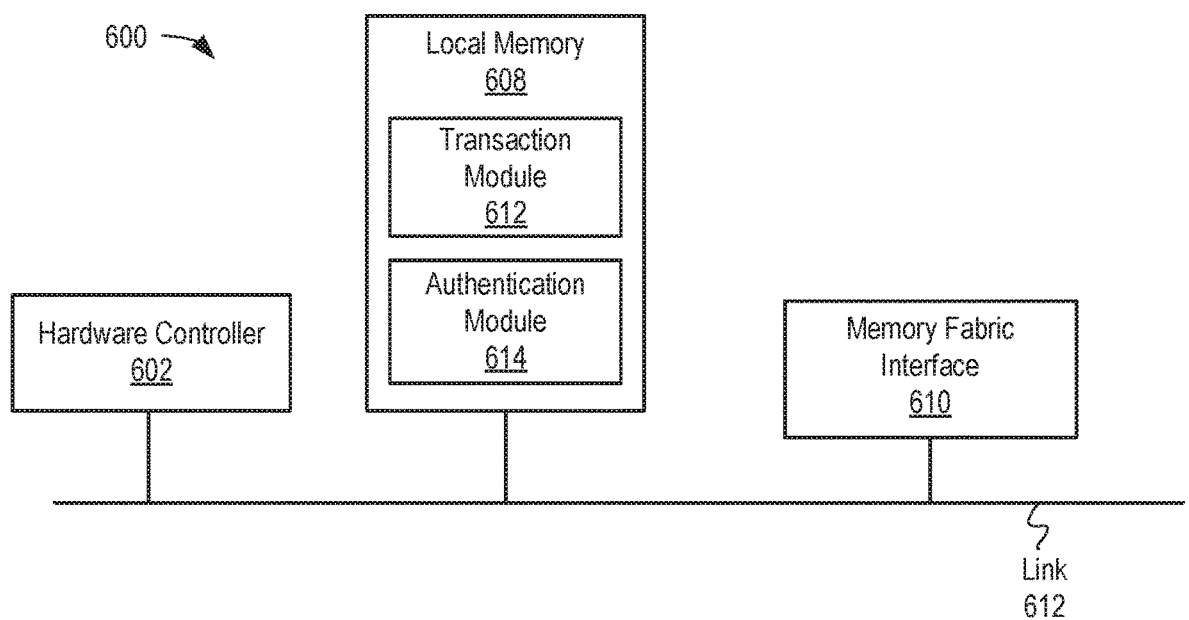
FIG. 6 shows a schematic representation of an electronic circuit that is connectable to a memory fabric, according to an example of the present disclosure.

Turning now to FIG. 6, a schematic representation of an electronic circuit 600 of the memory fabric is shown according to an example of the present disclosure. Examples of the electronic circuit 600 may include a central processor, memory controller, GPU, etc. that can send and receive secure transactions in the memory fabric shown in FIG. 1. The electronic circuit 600 may be employed to perform various functions of methods 300 and 500 as depicted in FIGS. 3 and 5 according to an example implementation. The electronic circuit 600 may include a hardware controller 602, a local memory 608, and a memory fabric interface 610. Each of these components may be operatively coupled to a link 612.

The local memory 608 may be a computer readable medium that stores machine readable instructions which are executable by the hardware controller 602. For example, the local memory 608 may store a transaction module 612 that is executable by the hardware controller 602 to obtain a transaction integrity key from a key distribution server and an authentication module 614 that is executable by the hardware controller 602 to compute a truncated keyed-hash message authentication code (HMAC) using the received transaction integrity key and append the truncated HMAC to a security message header (SMH) of the transaction. According to an example, the transaction module is further executable by the hardware controller 602 to transmit the transaction to another electronic circuit that shares a copy of the transaction integrity key. The transaction may be transmitted via the memory fabric interface 610, which connects the electronic circuit 600 to a memory fabric.

Figure 7:
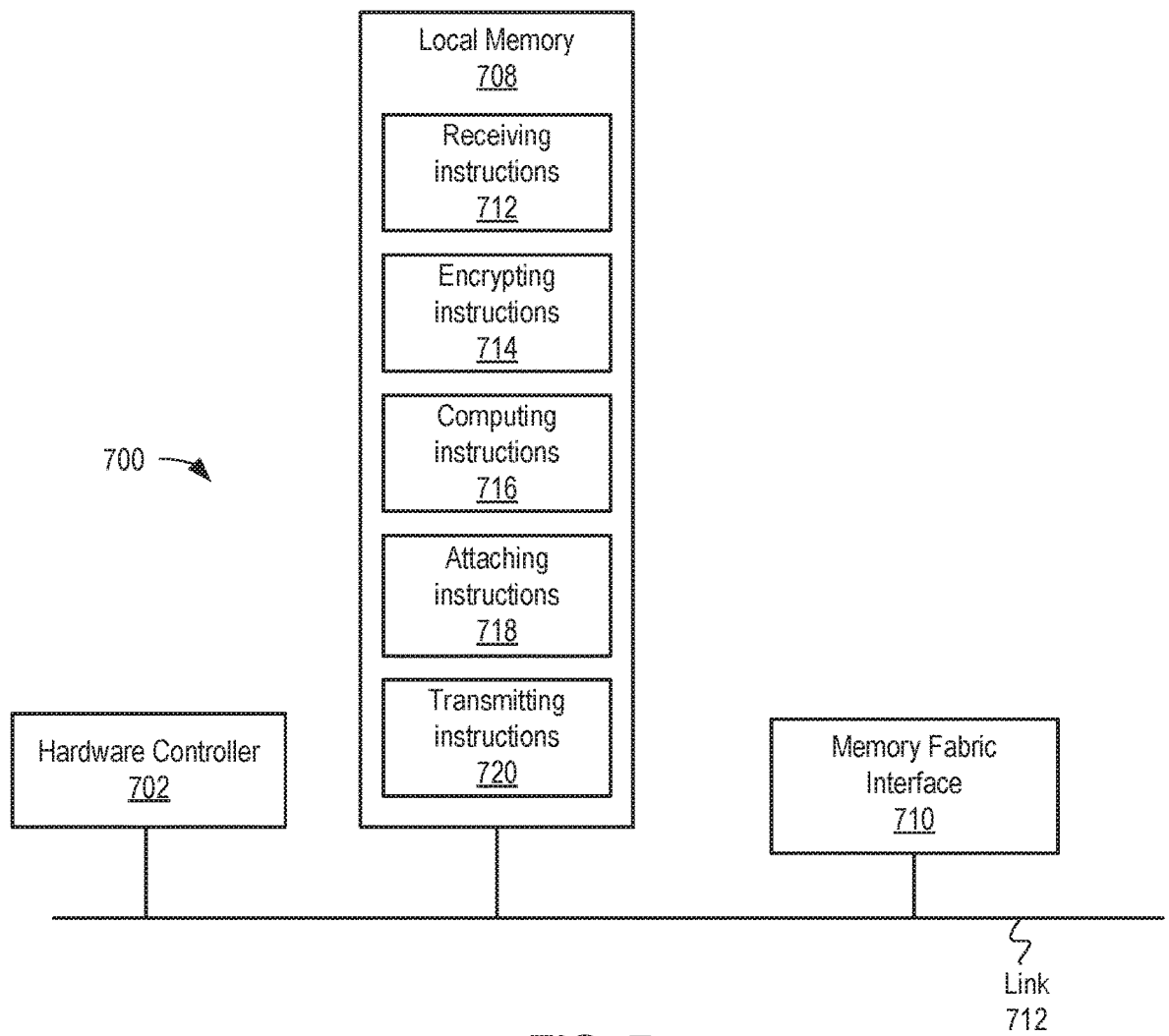
FIG. 7 shows a schematic representation of an electronic circuit that is connectable to a memory fabric, according to another example of the present disclosure.

Referring to FIG. 7, a schematic representation of an electronic circuit 700 of the memory fabric is shown according to another example of the present disclosure. The electronic circuit 700 may be employed to perform various functions of methods 300 and 500 as depicted in FIGS. 3 and 5 according to an example implementation. The electronic circuit 700 may include a hardware controller 702, a local memory 708, and a memory fabric interface 710. Each of these components may be operatively coupled to a link 712.

The local memory 708 may be a computer readable medium that stores machine readable instructions which are executable by the hardware controller 702. For example, the local memory 708 may store instructions to receive, at the electronic circuit 700 that is connectable to a memory fabric, a transaction integrity key and a transaction encryption key (712); instructions to encrypt a payload of a transaction using the transaction encryption key (714); instructions to compute a 64-bit key-hashed message authentication code (HMAC) using the transaction integrity key and the encrypted payload (716); instructions to attach the HMAC to a security message header (SMH) of the transaction (718); and instructions to transmit the transaction to a destination electronic circuit that shares copy of the transaction integrity key (720). The transaction may be transmitted via the memory fabric interface 710; which connects the electronic circuit 700 to a memory fabric.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A method to secure transactions between a source electronic circuit inside a device and a destination electronic circuit inside the device,
wherein the device comprises a memory fabric that is a physical layer topology inside of the device with electronic circuits that pass data to one another through interconnecting communication links inside of the device, and wherein the method comprises:
receiving, at the source electronic circuit in the memory fabric, a transaction integrity key from an electronic circuit inside the device that is designated as a key distribution server, wherein the transaction integrity key is encrypted by the key distribution server using an authentic copy of a public encryption key of the source electronic circuit and is digitally signed by the key distribution server using a digital signature key of the key distribution server;
computing, at the source electronic circuit, a truncated message authentication code (MAC) using the received transaction integrity key; and
attaching the truncated MAC to a security message header (SMH) of a transaction.

2. The method of claim 1, wherein the truncated MAC is a 64-bit keyed-hash message authentication code (HMAC).

3. The method of claim 1, further comprising:
receiving a transaction encryption key;
encrypting a payload of the transaction using the transaction encryption key; and
computing the truncated MAC using the transaction integrity key and the encrypted payload.

4. The method of claim 1, wherein receiving the transaction integrity key further comprises:
verifying an integrity of the received transaction integrity key using an authentic copy of a public digital verification key of the key distribution server; and
decrypting the received transaction integrity key using a private decryption key of the source electronic circuit.

5. The method of claim 4, further comprising at least one of:

receiving a transaction integrity key from the key distribution server, and deriving the transaction integrity key and a transaction encryption key from the transaction key using a key derivation function at the source electronic circuit; or deriving the transaction integrity key from a master key using a key derivation function at the key distribution server.

6. The method of claim 1, comprising transmitting the transaction to the destination electronic circuit, wherein the destination electronic circuit includes a shared copy of the transaction integrity key and all the electronic circuits are in a device.

7. The method of claim 1, wherein the transaction integrity key is a 128-bit key.

8. The method of claim 1, comprising concatenating at least one of a sequence number, a time value, and an arbitrary nonce to the SMH of the transaction to protect against a replay attack.

9. The method of claim 1 further comprising transmitting the transaction from the source electronic circuit in the memory fabric to the destination electronic circuit in the memory fabric.

10. The method of claim 9, wherein the source electronic circuit and the destination electronic circuit are each selected from a group of electronic circuits consisting of: a processor, a memory controller, and input/output controller, a storage controller, a field-programmable gate array, a digital signal processor, and a graphics processing unit.

11. The method of claim 1, further comprising deriving the transaction integrity key and a transaction encryption key, from a master key, using a key derivation function at a key distribution server.

12. An electronic circuit connectable to a memory fabric, the electronic circuit comprising:
a hardware controller; and
a local memory, storing machine readable instructions, executable by the hardware controller, comprising:
a transaction module to obtain a transaction integrity key from a key distribution server in the memory fabric;
an authentication module to compute a truncated keyed-hash message authentication code (HMAC) using the received transaction integrity key and append the truncated HMAC to a security message header (SMH) of the transaction;
wherein the transaction module is further to transmit the transaction to another electronic circuit in the memory fabric that shares a copy of the transaction integrity key;
the memory fabric implementing over the electronic circuit a memory fabric protocol operating on physical layer communications to send and receive the transaction integrity key between the electronic circuits over interconnecting communication links; and
the transaction integrity key being encrypted by the key distribution server using an authentic copy of a public encryption key of the electronic circuit and is digitally signed by the key distribution server using a digital signature of the key distribution server.

13. The electronic circuit of claim 12, wherein to compute the truncated HMAC, the machine readable instructions are executable by the hardware controller to compute a 64-bit HMAC.

14. The electronic circuit of claim 12, wherein the machine readable instructions are executable by the hardware controller to:
obtain a transaction encryption key from the key distribution server; encrypt a payload of the transaction using the transaction encryption key; and
compute the truncated HMAC using the transaction integrity key and the encrypted payload.

15. The electronic circuit of claim 12, wherein to obtain the transaction integrity key, the machine readable instructions are executable by the hardware controller to derive the transaction integrity key from a transaction key using a key derivation function.

16. The electronic circuit of claim 12, wherein the machine readable instructions are executable by the hardware controller to concatenate at least one of a sequence number, a time value, and an arbitrary nonce to the SMH of the transaction to protect against a replay attack.

17. The electronic circuit of claim 12 further comprising, deriving the transaction integrity key, from a master key, using a key derivation function at the key distribution server.

18. A non-transitory computer readable medium including machine readable instructions, executable by a hardware controller, to:
receive from a key distribution server inside a memory fabric, at an electronic circuit that is connectable to the memory fabric, a transaction integrity key and a transaction encryption key,
the transaction integrity key and the transaction encryption key being encrypted by the key distribution server using an authentic copy of a public encryption key of the electronic circuit, and is digitally signed by the key distribution server using a digital signature of the key distribution server, and
the memory fabric implementing over interconnecting communication links between the key distribution server and the electronic circuit a memory fabric protocol operating on physical layer communications to send and receive the transaction integrity key and the transaction encryption key between the key distribution server and the electronic circuit;
encrypt a payload of a transaction using the transaction encryption key;
compute a 64-bit key-hashed message authentication code (HMAC) using the transaction integrity key and the encrypted payload;
attach the HMAC to a security message header (SMH) of the transaction; and
transmit the transaction to a destination electronic circuit in the memory fabric that shares a copy of the transaction integrity key.

19. The non-transitory computer readable medium of claim 18, wherein to receive the transaction integrity key, the machine readable instructions are executable by the hardware controller to:
verify an integrity of the received transaction integrity key using an authentic copy of a public digital verification key of the key distribution server; and
decrypt the received transaction integrity key using a private decryption key of the source electronic circuit.

20. The non-transitory computer readable medium of claim 18 further comprising, deriving the transaction integrity key and the transaction encryption key, from a master key, using a key derivation function at the key distribution server.

* * * * *